(12) United States Patent
Reddy et al.

(10) Patent No.: US 9,602,043 B2
(45) Date of Patent: Mar. 21, 2017

(54) MAGNET MANAGEMENT IN ELECTRIC MACHINES

(71) Applicant: GENERAL ELECTRIC COMPANY, Schenectady, NY (US)

(72) Inventors: Patel Bhageerath Reddy, Niskayuna, NY (US); Ayman Mohamed Fawzi El-Refaie, Niskayuna, NY (US); Kum Kang Huh, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 72 days.

(21) Appl. No.: 14/473,216

(22) Filed: Aug. 29, 2014

(65) Prior Publication Data

US 2016/0065112 A1    Mar. 3, 2016

(51) Int. Cl.
*H02P 1/04* (2006.01)
*H02P 3/00* (2006.01)
*H02P 29/00* (2016.01)

(52) U.S. Cl.
CPC .......... *H02P 29/0066* (2013.01); *H02P 29/62* (2016.02); *H02P 29/662* (2016.11); *H02P 2207/05* (2013.01)

(58) Field of Classification Search
CPC ...... H02P 21/141; H02P 29/0083; H02P 6/00; H02P 6/001; H02P 9/006; H02P 9/305; B60S 1/08; H01F 13/003; H01F 41/028; H02K 11/0047; H02K 15/03; H02K 16/00; H02K 1/27; H02K 2213/03; H02K 11/0031

(Continued)

(56) References Cited

U.S. PATENT DOCUMENTS 3,717,804 A    2/1973  Dikinis et al.
4,139,790 A    2/1979  Steen (Continued)

FOREIGN PATENT DOCUMENTS

CN    103117635 A    5/2013
CN    103312262 A    9/2013

(Continued)

OTHER PUBLICATIONS

E. Richter et al., "The Ferrite Permanent Magnet AC Motor—A Technical and Economical Assessment," IEEE Transactions on Industry Applications, vol. 1A-21, No. 4, May/Jun. 1985, pp. 644-650.

(Continued)

*Primary Examiner* — Paul Ip
(74) *Attorney, Agent, or Firm* — Joseph J. Christian (57) ABSTRACT

A magnet management method of controlling a ferrite-type permanent magnet electrical machine includes receiving and/or estimating the temperature permanent magnets; determining if that temperature is below a predetermined temperature; and if so, then: selectively heating the magnets in order to prevent demagnetization and/or derating the machine. A similar method provides for controlling magnetization level by analyzing flux or magnetization level. Controllers that employ various methods are disclosed. The present invention has been described in terms of specific embodiment(s), and it is recognized that equivalents, alternatives, and modifications, aside from those expressly stated, are possible and within the scope of the appending claims.

26 Claims, 4 Drawing Sheets

(58) Field of Classification Search
USPC ......... 318/400.02, 400.08, 400.21, 430–434, 318/492, 473
See application file for complete search history.

(56) References Cited

U.S. PATENT DOCUMENTS

| | | | |
|---|---|---|---|
| 4,651,066 A | 3/1987 | Gritter et al. | |
| 4,710,667 A | 12/1987 | Whiteley | |
| 4,727,326 A * | 2/1988 | Kaplan | G01R 33/56 324/309 |
| 4,879,497 A * | 11/1989 | Meyer | G01K 7/20 318/400.08 |
| 5,311,125 A * | 5/1994 | Krause | G01R 33/16 324/201 |
| 5,506,500 A * | 4/1996 | Krause | G01R 33/16 324/201 |
| 5,652,517 A * | 7/1997 | Maki | G01R 33/383 324/318 |
| 5,747,909 A * | 5/1998 | Syverson | H02K 1/24 310/114 |
| 6,043,632 A | 3/2000 | Maehara et al. | |
| 6,359,359 B1 | 3/2002 | Miura et al. | |
| 6,504,275 B2 | 1/2003 | Nondahl et al. | |
| 6,606,019 B1 | 8/2003 | Ohashi | |
| 6,741,002 B2 | 5/2004 | Nishiyama et al. | |
| 6,828,889 B1 * | 12/2004 | Zaput | G01R 33/3815 324/318 |
| 6,838,964 B1 * | 1/2005 | Knight | G01R 33/3815 324/318 |
| 6,903,525 B2 * | 6/2005 | Carson | G01K 7/42 318/432 |
| 7,099,793 B2 * | 8/2006 | Rechberger | H02P 9/006 702/127 |
| 7,258,526 B2 | 8/2007 | Dooley et al. | |
| 7,304,478 B2 * | 12/2007 | Tsuda | G01R 33/3815 324/322 |
| 7,425,786 B2 | 9/2008 | Hino et al. | |
| 7,486,038 B2 * | 2/2009 | Amagasa | B60S 1/08 318/400.21 |
| 7,579,742 B1 | 8/2009 | Rittenhouse | |
| 7,804,261 B2 * | 9/2010 | Atarashi | H02P 6/00 318/139 |
| 7,821,365 B2 * | 10/2010 | Komura | H01F 13/003 335/284 |
| 7,839,108 B2 * | 11/2010 | Patel | H02H 7/0852 318/400.01 |
| 7,843,100 B2 | 11/2010 | Blissenbach et al. | |
| 7,962,019 B2 * | 6/2011 | Seeber | G01R 33/389 324/300 |
| 8,013,565 B2 * | 9/2011 | Miura | G01K 7/42 318/473 |
| 8,258,658 B2 | 9/2012 | Heitzler et al. | |
| 8,384,504 B2 * | 2/2013 | Diederichs | H01F 6/008 335/216 |
| 8,421,391 B2 * | 4/2013 | Yeh | G01K 7/42 318/400.15 |
| 8,732,612 B2 | 5/2014 | Hoerentrup et al. | |
| 9,160,206 B2 | 10/2015 | Potoradi et al. | |
| 2002/0157408 A1 * | 10/2002 | Egawa | F25B 49/025 62/228.1 |
| 2004/0257011 A1 * | 12/2004 | Rechberger | H02P 9/006 318/139 |
| 2005/0029975 A1 * | 2/2005 | Carson | G01K 7/42 318/432 |
| 2005/0046533 A1 | 3/2005 | Chell | |
| 2005/0248350 A1 * | 11/2005 | Tsuda | G01R 33/3815 324/322 |
| 2006/0266575 A1 * | 11/2006 | Nagase | B62D 5/046 180/446 |
| 2007/0159280 A1 * | 7/2007 | Diederichs | H01L 39/20 335/216 |
| 2007/0170801 A1 | 7/2007 | Sato et al. | |
| 2008/0100244 A1 * | 5/2008 | Amagasa | B60S 1/08 318/434 |
| 2008/0129237 A1 * | 6/2008 | Atarashi | H02P 6/00 318/492 |
| 2008/0169892 A1 * | 7/2008 | Komura | H01F 13/003 335/284 |
| 2008/0238234 A1 | 10/2008 | Saban et al. | |
| 2008/0303368 A1 | 12/2008 | Rahman et al. | |
| 2009/0123139 A1 * | 5/2009 | Seeber | G01R 33/389 392/416 |
| 2009/0179602 A1 * | 7/2009 | Hayashi | H02P 21/14 318/400.02 |
| 2009/0189561 A1 * | 7/2009 | Patel | H02H 7/0852 318/806 |
| 2009/0284202 A1 * | 11/2009 | Miura | G01K 7/42 318/473 |
| 2010/0001821 A1 * | 1/2010 | Diederichs | H01F 6/008 335/216 |
| 2010/0176674 A1 | 7/2010 | Post | |
| 2010/0188083 A1 * | 7/2010 | Cao | G01R 33/3804 324/307 |
| 2011/0050141 A1 * | 3/2011 | Yeh | H02P 6/08 318/434 |
| 2011/0157752 A1 * | 6/2011 | Sakanobe | H02H 7/0833 361/18 |
| 2011/0234180 A1 * | 9/2011 | Cullen | H02P 29/0066 322/89 |
| 2011/0241467 A1 | 10/2011 | Fujioka et al. | |
| 2011/0279074 A1 * | 11/2011 | Yeh | G01K 7/42 318/432 |
| 2012/0299409 A1 | 11/2012 | Choi et al. | |
| 2013/0207498 A1 * | 8/2013 | Kusase | H02K 1/16 310/156.01 |
| 2013/0249448 A1 * | 9/2013 | Kobayashi | H02P 21/141 318/400.02 |
| 2014/0054986 A1 * | 2/2014 | Hirai | H02P 29/0066 310/53 |
| 2014/0096503 A1 * | 4/2014 | Ribarov | H05B 6/109 60/39.093 |
| 2014/0187382 A1 * | 7/2014 | Kang | F16H 61/0031 477/98 |
| 2014/0350762 A1 * | 11/2014 | Wesenberg | H02P 29/0044 701/22 |
| 2015/0115757 A1 | 4/2015 | Reddy et al. | |
| 2015/0188480 A1 * | 7/2015 | Liu | F04D 25/06 318/430 |

FOREIGN PATENT DOCUMENTS

| | | | |
|---|---|---|---|
| DE | 10045291 A1 | | 3/2002 |
| DE | 10 2011 121 272.1 | * | 12/2011 |
| JP | 05-184192 | * | 7/1993 |
| JP | 2005127406 A | | 5/2005 |
| JP | 2006094590 A | | 4/2006 |
| JP | 2013009542 A | | 1/2013 |
| KR | 10-2012-0156615 | * | 12/2012 |
| WO | WO93-13589 | * | 7/1993 |
| WO | 03016794 A1 | | 2/2003 |
| WO | 2013009542 A | | 1/2013 |
| WO | WO2013/087150 A2 | * | 6/2013 |
| WO | 2013108877 A1 | | 7/2013 |
| WO | 2014016679 A1 | | 1/2014 |

OTHER PUBLICATIONS

M. Sanada et al. "Rotor Structure for Reducing Demagnetization of Magnet in a PMASynRM with Ferrite Permaent Magnet and its Characteristics," IEEE, 2011, pp. 4189-4194.

US Non-Final Office Action issued in connection with Related U.S. Appl. No. 14/063,547 on Nov. 14, 2016.

European Search Report issued in connection with corresponding EP Application No. 14190298.1 on Nov. 16, 2015.

(56) References Cited

OTHER PUBLICATIONS

European Search Report issued in connection with corresponding EP Application No. 15182787.0 on May 13, 2016.

\* cited by examiner

MAGNET MANAGEMENT IN ELECTRIC MACHINES

GOVERNMENT LICENSE RIGHTS

This invention was made with Government support under contract number DE-EE0005573 awarded by the United States Department of Energy. The Government has certain rights in the invention.

CROSS-REFERENCE TO RELATED APPLICATIONS

This application is related to commonly assigned U.S. patent application Ser. No. 14/064,547, entitled "SYSTEM AND METHOD FOR HEATING FERRITE MAGNET MOTORS FOR LOW TEMPERATURES", currently pending, the contents which are incorporated herein by reference in its entirety.

BACKGROUND OF THE INVENTION

Embodiments of the invention relate generally to electrical machines and the heating of magnets in ferrite-type magnet motors to prevent demagnetization and, more particularly, to magnet management of these heating methodologies and/or motors that may be used in electric and/or hybrid electric vehicles, as well as other applications.

The usage of electrical machines in various industries has continued to become more prevalent in numerous industrial, commercial, and transportation industries over time. In an attempt to realize high performance in electric machines, the choice of using permanent magnet (PM) materials is becoming more popular for many applications. In such machines, the PMs can either replace electromagnets in traditional designs, or novel topologies can be developed to make the best use of the properties and characteristics of PMs.

One PM electrical machine topology that has been developed is referred to as "stator permanent magnet machines," which are electrical machines that are designed such that the PMs in the machine are positioned on the stator. Stator permanent magnet machines can thus refer to, but are not limited to, permanent magnet flux switching machines, permanent magnet flux reversal machines, and doubly-salient permanent magnet machines. Another PM electrical machine topology that has been developed is referred to as "interior permanent magnet (IPM) machines," which are electrical machines that are designed such that the PMs in the machine are embedded inside the laminations of a rotor. IPM machines can thus refer to IPM motors or generators widely used in a variety of applications, including aircraft, automobiles and industrial usage.

One issue that is taken into consideration when constructing and operating a PM electrical machine is demagnetization of the PMs. Depending on the type of PMs employed, demagnetization of the PMs can occur if the electrical machine is exposed to extremely high or extremely low temperatures. For example, if the PMs are rare earth magnets, exposure of the PMs to extremely high temperatures can make the PMs more susceptible to demagnetization. Conversely, if the PMs are ferrite magnets, exposure of the PMs to low temperatures (e.g., −40° to 60° C.) can make the PMs more susceptible to demagnetization.

It is recognized that the use of ferrite magnets in PM electrical machines can provide cost savings as compared to the use of rare earth magnets, and thus the use of ferrite magnets may be desirable in some PM electrical machines. While ferrite magnets are more prone to demagnetization at lower temperatures compared to rare earth magnets, they are less prone to demagnetization at higher temperatures than rare earth magnets. Thus, if solutions can be provided for preventing demagnetization of ferrite magnets at low temperatures, ferrite magnet PM machines can be a desirable alternative to rare earth magnet PM machines.

As a result, the aforementioned referenced patent application provides for various systems and methods for preventing the demagnetization of ferrite magnets in a PM machine. This leads to a ferrite magnet PM machine that is useable over a wider range of ambient temperatures and that exhibits improved resistance to corrosion and improved stability. The improved PM machine may then lead to enhanced opportunities for a wide range of applications including, for example, with vehicle applications.

Accordingly, there is an opportunity to improve upon the operation, for example, of vehicles (and in other applications) that include motors that utilize these ferrite-type magnet methods and systems in their PM machine(s).

BRIEF DESCRIPTION

The present invention overcomes at least some of the aforementioned drawbacks by providing a method of controlling a ferrite-type permanent magnet electrical machine that mitigates the degradation of machine performance due to demagnetization of the magnets at low temperatures. More specifically, the present invention is directed to a control module, or controller, that provides for magnet management instructions in various applications such as, but not limited, in electric or hybrid electric vehicles.

Therefore, in accordance with one aspect of the invention, a method of controlling a ferrite-type permanent magnet electrical machine, the method comprising: one of receiving and estimating a temperature of a plurality of permanent magnets; determining if the temperature is below a predetermined temperature; and if the temperature is below the predetermined temperature, at least one of: selectively heating the plurality of ferrite-type permanent magnets in order to prevent demagnetization of the plurality of permanent magnets; and derating the electrical machine.

In accordance with another aspect of the invention, a controller comprising programming instructions to: one of receive and estimate a temperature of a plurality of ferrite-type permanent magnets in an electrical machine; compare the temperature with a predetermined temperature; and send current injection information to an operating controller of the electrical machine, wherein the current injection information comprises instructions configured to prevent demagnetization of the plurality of ferrite-type permanent magnets.

In accordance with another aspect of the invention, a controller comprising programming instructions to: receive or estimate a back-emf of a ferrite-type permanent magnet machine, said ferrite-type permanent magnet machine having a plurality of ferrite-type permanent magnets; compare the received or estimated back-emf with a predetermined back-emf; and send current injection information to an operating controller of the ferrite-type permanent machine, wherein the current injection information comprises instructions configured to prevent demagnetization of the plurality of ferrite-type permanent magnets.

In accordance with another aspect of the invention, a method of controlling a ferrite-type permanent magnet electrical machine, the method comprising: one of receiving and estimating a magnetization level of a plurality of permanent magnets; determining if the magnetization level is above a predetermined level; and if the magnetization level is above the predetermined level, at least one of: selectively heating the plurality of ferrite-type permanent magnets in order to prevent demagnetization of the plurality of permanent magnets; and derating the electrical machine.

In accordance with another aspect of the invention, a controller comprising programming instructions to: inject one of a current or a voltage to a ferrite-type permanent magnet machine, said ferrite-type permanent magnet machine having a plurality of ferrite-type permanent magnets; estimate impedance based on the injecting; selectively heat the plurality of ferrite-type permanent magnets based on the estimated impedance; and limit current to the machine.

Various other features and advantages of the present invention will be made apparent from the following detailed description and the drawings.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Unless defined otherwise, technical and scientific terms used herein have the same meaning as is commonly understood by one of ordinary skill in the art with respect to the presently disclosed subject matter. The terms "first", "second", and the like, as used herein do not denote any order, quantity, or importance, but rather are used to distinguish one element from another. The terms "a", "an", and "the" do not denote a limitation of quantity, but rather denote the presence of at least one of the referenced item, and the terms "front", "back", "bottom", and/or "top", unless otherwise noted, are used for convenience of description only, and are not limited to any one position or spatial orientation.

If ranges are disclosed, the endpoints of all ranges directed to the same component or property are inclusive and independently combinable (e.g., ranges of "up to about 25 wt. %," is inclusive of the endpoints and all intermediate values of the ranges of "about 5 wt. % to about 25 wt. %," etc.). The modified "about" used in connection with a quantity is inclusive of the stated value and has the meaning dictated by the context (e.g., includes the degree of error associated with measurement of the particular quantity). Accordingly, the value modified by the term "about" is not necessarily limited only to the precise value specified.

As used herein, "ferrite-type magnet" means both ferrite-based magnets as well as types of magnets and/or magnet compositions' now known or later developed' that exhibit temperature-related behaviors similar to the ferrite-based magnets discussed herein. For example, but not by limitation, certain embodiments of ferrite-type magnets could conceivably include magnets and/or magnet compositions that, in fact, contact no, or only trace amounts, of iron.

As used herein, "low temperature" means at or below temperatures that can make ferrite-type permanent magnets more susceptible to demagnetization. For example, but not by limitation, it could be in the range from about $-40°$ C. to about $60°$ C. However, the low temperature may be different than the aforementioned range. For example, the range could differ for a variety of reasons including the motor size and configuration; pressure; motor application; and/or other factors.

As referenced above, the present invention is related and extends from aspects of commonly assigned U.S. patent application Ser. No. 14/063,547, entitled "SYSTEM AND METHOD FOR HEATING FERRITE MAGNET MOTORS FOR LOW TEMPERATURES", the contents which are incorporated herein by reference in its entirety. In general, but not by limitation, this invention provides for further application of the methods and systems of the earlier invention. These applications include, but are not limited to, the operation of vehicles that may have one or more motors that have ferrite-type magnets therein.

Aspects of the present invention provide for a Magnet Management Module (MMM), or controller, that is configured to aid in the prevention of demagnetization of ferrite-type magnets at or during lower temperatures. The MMM may reside in a motor control module. The MMM introduces the concept of rotor or stator heating to ensure that the ferrite-type magnet temperature is above the demagnetizing temperature. The MMM has the magnet temperature as a controllable variable to ensure the magnets are not demagnetized. Demagnetization of the magnets can affect the operating flux density and field strength of the magnets of the ferrite-type magnet. Demagnetization can ultimately result in degraded motor performance and/or a destroyed motor. The MMM may observe the remanence and coercivity from at least one of the flux linkage and output torque of the motor.

Figure 1:
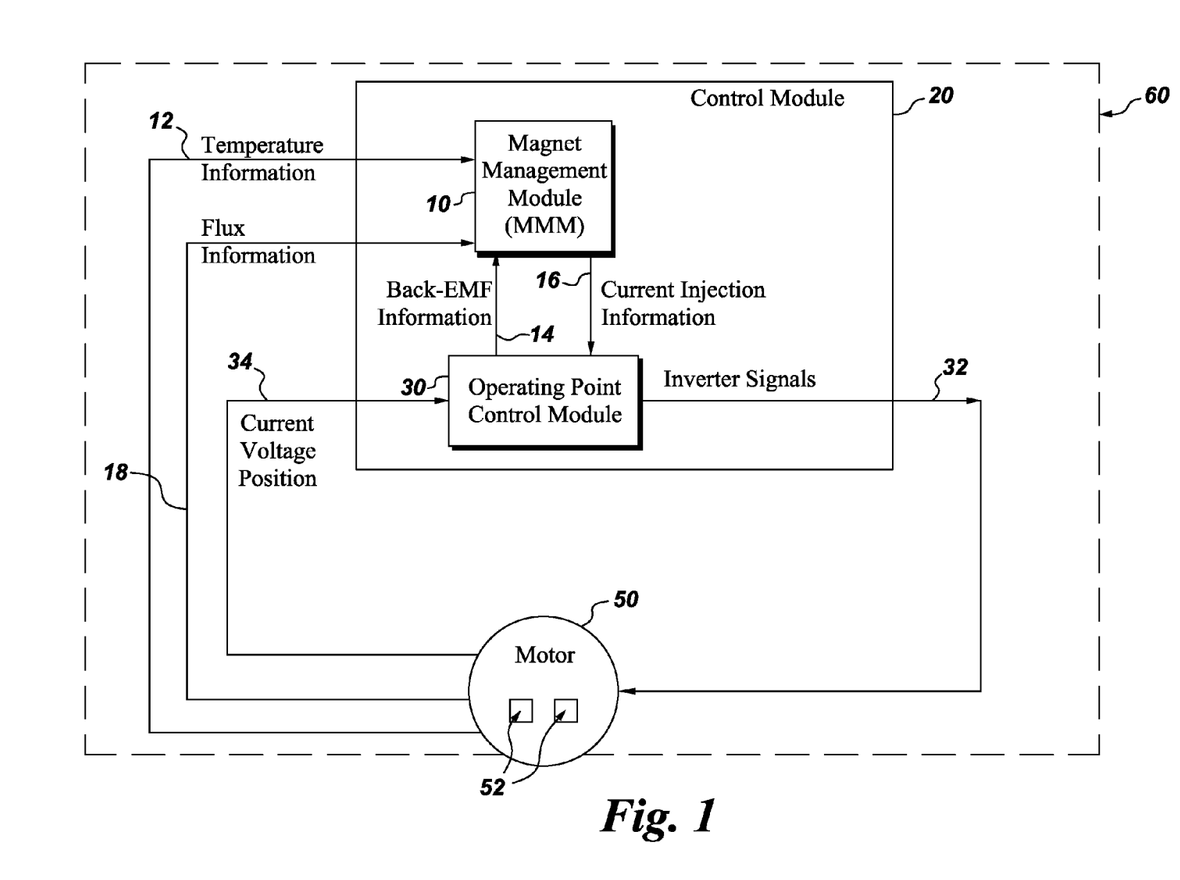
FIG. 1 is a schematic diagram of a magnet management environment according to an embodiment of the present invention.
Figure 2:
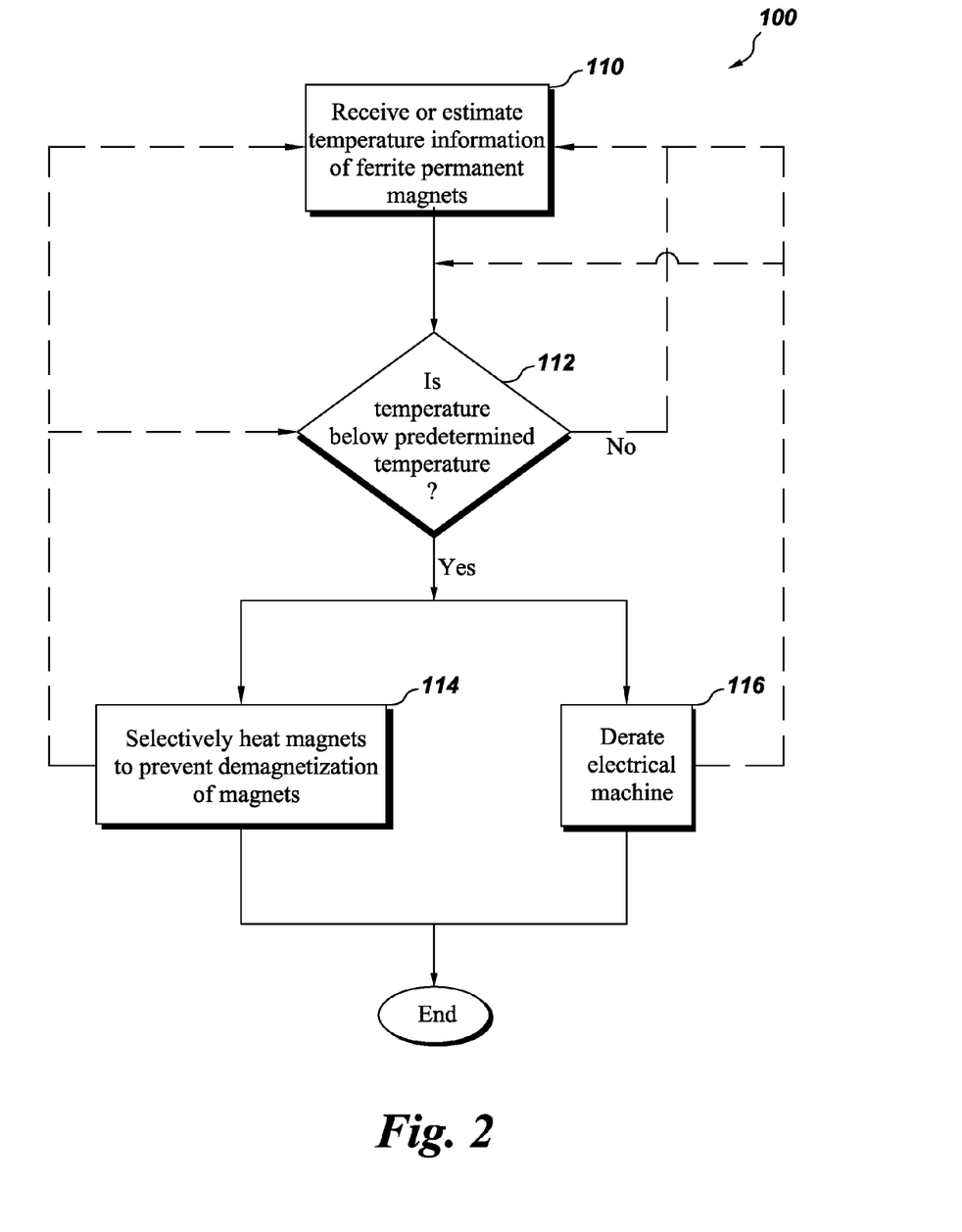
FIG. 2 is a flowchart of a method of operation according to an embodiment of the present invention.
Figure 3:
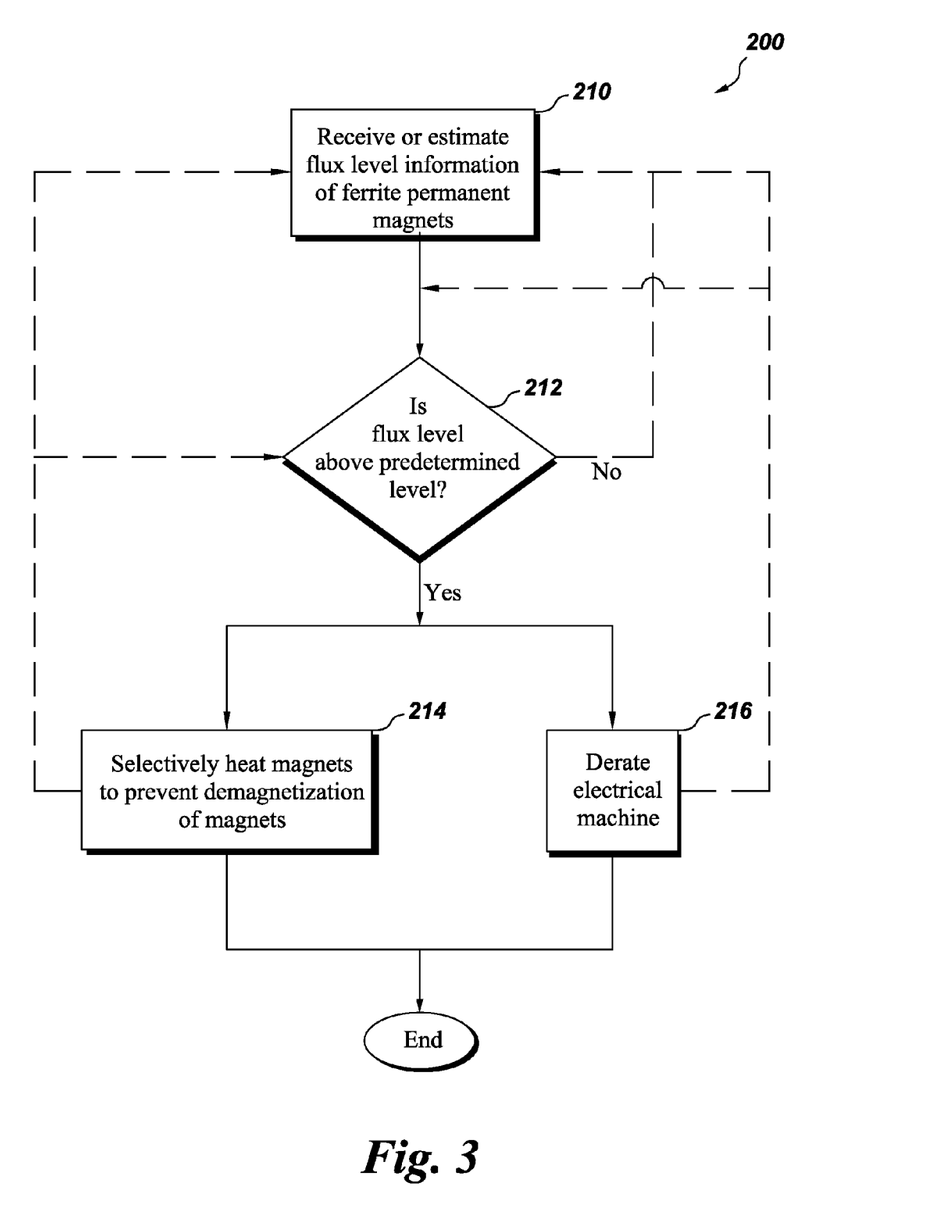
FIG. 3 is a flowchart of a method of operation according to an embodiment of the present invention.

Referring concurrently to the FIGS. 1-3, the figures illustrate a schematic diagram of a magnet management environment (FIG. 1) and two flowcharts (FIGS. 2 and 3) of methods of operation, respectively, according to aspects of the present invention. As shown, a magnet management module (MMM) 10 resides within a control module 20 that is used to operate a motor, or electrical machine, 50 that includes a plurality of ferrite-type magnets 52 therein. Depending on the application of the motor 50, the environment may reside further within a vehicle 60. Depending on the application, the MMM 10 receives instructions and/or information and sends instructions and/or information ultimately preventing the demagnetization of the magnets 52 due to low temperatures.

The MMM 10 may receive information including one of: temperature information 12 and/or flux, or magnetization, information 18 from the motor 50 and back-emf information 14 from an operating point control module 30 that is in communication with the motor 50. The operating point control module 30 may be receiving at least one of current, voltage, and/or position information 34 and sending inverter signals 32 to the motor 50. The inverter signals 32 sent to the motor 50 may be based, in part, on current injection information 16.

The MMM 10 comprises a control module or controller that comprises programming instructions. The programming instructions comprise instructions to receive the temperature information 12 of the plurality of ferrite-type permanent magnets 52 residing in the electrical machine 50. In addition, or alternatively, the MMM 10 may estimate a temperature of the plurality of ferrite-type permanent magnets 52. The MMM 10 also may compare the received and/or estimated temperature to one, or more, predetermined temperatures. Based on the comparison, the MMM 10 sends current injection information 16 to the operating point control module 30 of the electrical machine 50 so as to prevent demagnetization of the magnets 52.

As further shown, the back-emf information 14 from the operating point control module 30 may be derived from one of the current, voltage, and position 34 of the machine 50. Contrastingly, the MMM 10 sends current injection information 16 to the operating point control module 30 that, in turn, leads to inverter signals 32 sent to the motor 50 so as to prevent demagnetization of the magnets 52 therein. The current injection information 16 includes instructions to selectively heat the plurality of ferrite-type permanent magnets 52 by at least one of: heating the magnets 52 for a fixed duration; heating the magnets 52 to a predetermined temperature; and, heating the magnets 52 to a predetermined rate of rise in temperature of the magnets 52. In an embodiment, the current injection information 16 further comprises instructions to also derate operation of the motor 50 and/or delay operation of the motor 50. One way to derate and/or delay operation is to limit the current to the motor 50 and, in the case of delaying operation, reduce the current to zero to the motor 50.

Depending on the embodiment, there are a variety of instructions that can be sent so as to delay operation of the motor 50 so as to prevent demagnetization of the magnets 52. For example, but without limitation, the delay in the operation of the motor 50 could be one or more of the following: simply inactivating operation of the motor 50; delaying operation of the motor 50 for a set period of time; delaying operation of the motor 50 until a predetermined temperature in the magnets 52 is reached; and/or delaying operation of the motor 50 until a predetermined rate of rise in the temperature increase is reached.

Referring to the flowchart in FIG. 2, a method 100 for controlling a ferrite-type magnet electrical machine 50 is depicted. The method 100 may comprise receiving and/or estimating a temperature of the plurality of ferrite-type permanent magnets at 110. The MMM 10 (FIG. 1) then, at 112, determines if the received and/or estimated temperature is below a predetermined temperature. If at 112, the answer is "NO" (i.e., the received and/or estimated temperature is not below the predetermined temperature), then the method could stop; or, alternatively, the MMM 10 may continue receiving and/or estimating temperatures of the magnets 52 (i.e., resume back to 110).

If at 112, the answer is "YES" (i.e., the received and/or estimated temperature is below the predetermined temperature), then the method 100 proceeds to one or both of 114 and 116. At 114, the method 100 continues with the MMM 10 selectively heating the magnets 52 so as to prevent demagnetization of the magnets 52. Alternatively, or additionally, at 116 the method 100 continues with the MMM 10 derating the motor 50. Upon the completion of either or both of 114 and 116, the method 100 may end. Alternatively, the method 100 may optionally return either of continuing to receive and/or estimate temperatures of the magnets 52 (i.e., 110) and/or determining if the received and/or estimated temperature is below the predetermined temperature, at 112.

In embodiments of the method 100, the selective heating (i.e., 114) may further comprise one or more types of selective heating including heating for a predetermined period of time; heating until the magnets 52 reach a certain, predetermined setpoint temperature; and/or, heating until a predetermined rate of rise temperature rate is attained.

In embodiments of the method 100, the determining (i.e., 112) may further comprise determining if a time delay is available prior to operation of the machine 50 in a situation where 112 answers "YES". For example, the time delay may include a determination if the vehicle 60 user can, or cannot, accept immediate use of the motor 50 and vehicle 60. If a time delay is not available, then the motor 50 may be derated (i.e., 116) or the motor 50 may be made inoperable, until the predetermined temperature is reached so as to not demagnetize the magnets 52. Contrastingly, if a time delay is available, then the selective heating, at 114, can take place. The derating at 116 may be accomplished by limiting the current available to the motor 50.

Referring to 110 in the method 100, there are a variety of ways to receive and/or estimate the magnet temperature.

According to an embodiment, the estimating of the temperature of the plurality of the permanent magnets 52 can include estimating by indirectly measuring the temperature of the magnets 52. That is temperatures information of element(s) other than measuring the actual temperature of the magnets 52 proper may be obtained. From this indirect measurement, then the temperature of the magnets 52 may be estimated and/or derived. For example, the temperature of one or more of the lamination temperature, ambient temperature, housing temperature, and winding temperature may be measured. Additional information may optionally be used in addition to the indirect temperatures to derive an estimate of the magnet temperature. For example, a thermal model of the electrical machine 50 and/or information related to the heat in the machine 50 may be applied to the indirect temperature information of the machine 50 to then estimate the temperature of the magnets 52.

According to an embodiment, the estimating of the temperature of the plurality of the permanent magnets 52 can additionally or alternatively include estimating based on one or more of the motor terminal quantities of the machine 50. The motor terminal quantities may include, for example, voltage and/or current. For example, the machine 50 may be run with zero current as an open circuit spinning and short circuit testing.

According to an embodiment, the estimating of the temperature of the plurality of the permanent magnets 52 can additionally or alternatively include estimating the temperature using injected test voltage and/or test current to the machine 50 and then estimating the small signal impedance and/or estimating the magnetization level.

It should be apparent that in embodiments of the method, that various repeating of step(s) is possible without diverting from the invention. For example, the receiving, estimating, determining, and heating could each, or all, could be continually repeating, intermittently repeating, discretely occurring, automatically occurring, or operational by the user of the vehicle 60 and/or motor 50.

Referring to the flowchart in FIG. 3, another embodiment of a method 200 for controlling a ferrite-type magnet electrical machine 50 is depicted. The method 200 may comprise receiving and/or estimating a magnetization level, or flux level, of the plurality of ferrite-type permanent magnets at 210. The MMM 10 (FIG. 1) then, at 212, determines if the received or estimated flux level is above a predetermined level. If at 212, the answer is "NO" (i.e., the received and/or estimated flux level is not above the predetermined level), then the method could stop; or, alternatively, the MMM 10 may continue receiving and/or estimating flux levels of the magnets 52 (i.e., resume back to 210).

If at 212, the answer is "YES" (i.e., the received and/or estimated flux level is above the predetermined level), then the method 200 proceeds to one or both of 214 and 216. At 214, the method 200 continues with the MMM 10 selectively heating the magnets 52 so as to prevent demagnetization of the magnets 52. Alternatively, or additionally, at 216 the method 200 continues with the MMM 10 derating the motor 50. Upon the completion of either, or both, of 214 and 216, the method 200 may end. Alternatively, the method 200 may optionally return either of continuing to receive and/or estimate flux levels of the magnets 52 (i.e., 210) and/or determining if the received and/or estimated flux level is above the predetermined level, at 212.

In embodiments of the method 200, the selective heating (i.e., 214) may further comprise one or more types of selective heating including heating for a predetermined period of time; heating until the magnets 52 reach a certain, predetermined setpoint temperature; and/or, heating until a predetermined rate of rise temperature rate is attained.

In embodiments of the method 200, the determining (i.e., 212) may further comprise determining if a time delay is available prior to operation of the machine 50 in a situation where 212 answers "YES". For example, the time delay may include a determination if the vehicle 60 user can, or cannot, accept immediate use of the motor 50 and vehicle 60. If a time delay is not available, then the motor 50 may be derated (i.e., 216) or the motor 50 may be made inoperable, until the predetermined temperature is reached so as to not demagnetize the magnets 52. Contrastingly, if a time delay is available, then the selective heating, at 214, can take place. The derating at 216 may be accomplished by limiting the current available to the motor 50.

Referring to 210 in the method 200, there are a variety of ways to receive and/or estimate the flux level.

According to an embodiment, the estimating of the flux level of the plurality of the permanent magnets 52 can include estimating flux level based on one or more of the motor terminal quantities of the machine 50. The motor terminal quantities may include, for example, voltage and/or current. For example, the machine 50 may be run with zero current as an open circuit spinning and short circuit testing.

According to an embodiment, the estimating of the flux level of the plurality of the permanent magnets 52 can additionally or alternatively include estimating the flux level using injected test voltage and/or test current to the machine 50 and then estimating the small signal impedance and/or estimating the flux level.

It should be apparent that in embodiments of the method, that various repeating of step(s) is possible without diverting from the invention. For example, the receiving, estimating, determining, and heating could each, or all, could be continually repeating, intermittently repeating, discretely occurring, automatically occurring, or operational by the user of the vehicle 60 and/or motor 50.

Figure 4:
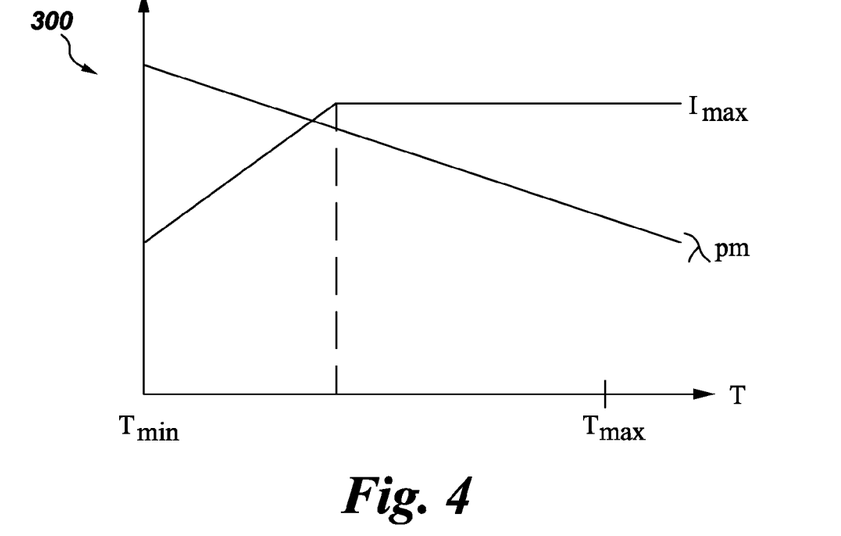
FIG. 4 is a graph depicting the variation of current limit imposed on the machine and the permanent magnet flux linkage, or magnetization level, against received or estimated temperature according to an embodiment of the present invention.
Figure 5:
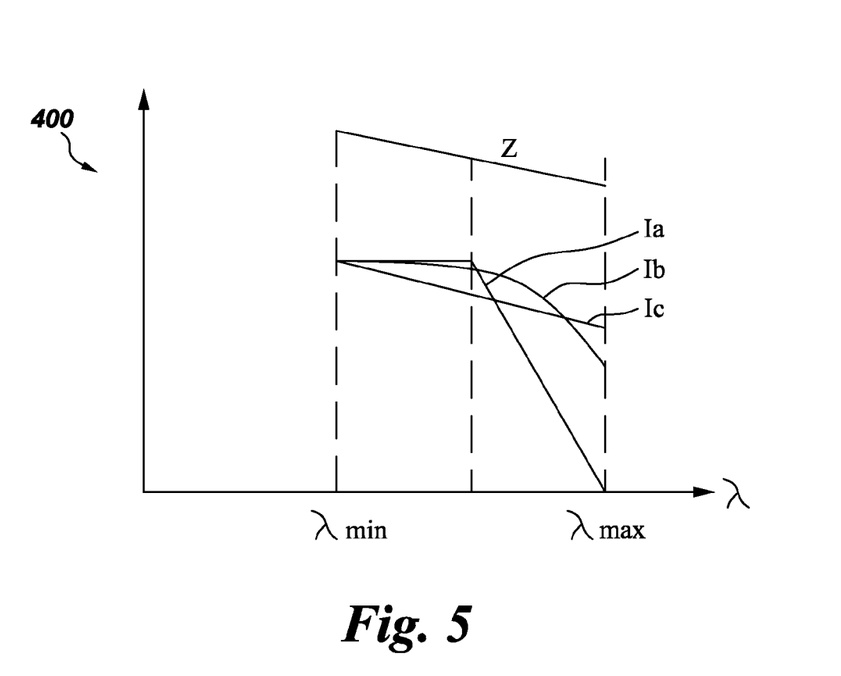
FIG. 5 is a graph depicting impedance against flux linkage, or magnetization level, in the machine, and the variations of current limits against the flux linkage in the machine, according to an embodiment of the present invention.

Referring to FIG. 4 depicting the variation of current limits imposed on the machine the permanent magnet flux linkage, or magnetization level, against temperature, and FIG. 5 depicting impedance and current limits imposed on the machine against flux linkage in the machine, respectively.

As FIG. 4 illustrates at 300, the current limit of a machine is shown as $I_{max}$. As shown, below a certain temperature, the current limit of the machine is derated (i.e., sloping graph). Similarly, the permanent magnet flux linkage, or magnetization level, is shown as $\lambda_{pm}$. The y-axis shows the received or estimated magnet temperature, as T.

As FIG. 5 illustrates at 400, the current limits of the machine are a function of the magnetization level. Embodiments of only three possible current limits are shown at $I_a$, $I_b$, and $I_c$. The current limit may be virtually any function of the magnetization level. For example, at $I_c$ the function may be linear; at $I_b$ the function may be curved downward; and, at $I_a$ the function may be level and then linear below a certain value. As shown, a small signal impedance (voltage or current) may be injected. From the injection, the impedance may be estimated.

While the embodiments illustrated and described herein may be used with an electrical machine such as a traction motor in an electric vehicle or hybrid electric vehicle aspects of the present invention can be used in other electric machine applications without departing from the scope of the invention. For example and without limitation, the electric machine could be a stationary motor used in a cold temperature environment, a non-traction motor on a vehicle, and the like.

Therefore, in accordance with one aspect of the invention, a method of controlling a ferrite-type permanent magnet electrical machine, the method comprising: one of receiving and estimating a temperature of a plurality of permanent magnets; determining if the temperature is below a predetermined temperature; and if the temperature is below the predetermined temperature, at least one of: selectively heating the plurality of ferrite-type permanent magnets in order to prevent demagnetization of the plurality of permanent magnets; and derating the electrical machine.

In accordance with another aspect of the invention, a controller comprising programming instructions to: one of receive and estimate a temperature of a plurality of ferrite-type permanent magnets in an electrical machine; compare the temperature with a predetermined temperature; and send current injection information to an operating controller of the electrical machine, wherein the current injection information comprises instructions configured to prevent demagnetization of the plurality of ferrite-type permanent magnets.

In accordance with another aspect of the invention, a controller comprising programming instructions to: receive or estimate a back-emf of a ferrite-type permanent magnet machine, said ferrite-type permanent magnet machine having a plurality of ferrite-type permanent magnets; compare the received or estimated back-emf with a predetermined back-emf; and send current injection information to an operating controller of the ferrite-type permanent machine, wherein the current injection information comprises instructions configured to prevent demagnetization of the plurality of ferrite-type permanent magnets.

In accordance with another aspect of the invention, a method of controlling a ferrite-type permanent magnet electrical machine, the method comprising: one of receiving and estimating a magnetization level of a plurality of permanent magnets; determining if the magnetization level is above a predetermined level; and if the magnetization level is above the predetermined level, at least one of: selectively heating the plurality of ferrite-type permanent magnets in order to prevent demagnetization of the plurality of permanent magnets; and derating the electrical machine.

In accordance with another aspect of the invention, a controller comprising programming instructions to: inject one of a current or a voltage to a ferrite-type permanent magnet machine, said ferrite-type permanent magnet machine having a plurality of ferrite-type permanent magnets; estimate impedance based on the injecting; selectively heat the plurality of ferrite-type permanent magnets based on the estimated impedance; and limit current to the machine.

While only certain features of the invention have been illustrated and/or described herein, many modifications and changes will occur to those skilled in the art. Although individual embodiments are discussed, the present invention covers all combination of all of those embodiments. It is understood that the appended claims are intended to cover all such modification and changes as fall within the intent of the invention.

What is claimed is:

1. A method of controlling an electrical machine, the method comprising:
    measuring one of flux information and temperature information of a plurality of ferrite-type permanent magnets of a motor;
    sending back-emf-information from an operating point control module in communication with the motor to a magnet management module, wherein the magnet management module:
        receives of one the flux information and the temperature information;
        determines if the temperature is below a predetermined temperature; and if so, then perform at least one of the following:
        selectively heats the plurality of ferrite-type permanent magnets in order to prevent demagnetization of the plurality of ferrite-type permanent magnets; and
        derates the electrical machine.

2. The method of claim 1, the plurality of ferrite-type permanent magnets is selectively heated for a predetermined time period.

3. The method of claim 1, the plurality of ferrite-type permanent magnets is selectively heated until the plurality of permanent magnets reach a predetermined temperature.

4. The method of claim 1, the plurality of ferrite-type permanent magnets is selectively heated for a predetermined rate of rise temperature.

5. The method of claim 1, wherein the step of determining whether the temperature is below the predetermined temperature comprises determining if a time delay is available prior to operating the electrical machine.

6. The method of claim 5, wherein, if the time delay is not available, then the electrical machine is derated by limiting a maximum current through the electrical machine.

7. The method of claim 5, wherein if the time delay is available, then the plurality of ferrite-type permanent magnets are selectively heated in order to prevent demagnetization of the plurality of permanent magnets.

8. The method of claim 1, wherein the electrical machine is derated by limiting a current available to the electrical machine.

9. The method of claim 1, if the temperature is below the predetermined temperature, then operation of the electrical machine is deactivated.

10. The method of claim 1, wherein the magnet management module repeats at least one of the receiving step, the determining step, the selectively heating step, and the derating step.

11. The method of claim 1, wherein the temperature information of the plurality of ferrite-type permanent magnets is estimated based on one of:
    indirectly measuring at least one temperature of the plurality of ferrite-type permanent magnets; and
    estimating one of motor terminal quantities; and
    injecting one of a test current and a test voltage to the electrical machine.

12. The method of claim 11, wherein the step of indirect measurement of at least one temperature of the plurality of ferrite-type permanent magnets comprises one of measuring one of: a lamination temperature, an ambient temperature, a housing temperature, and a winding temperature; and applying a thermal model of the electrical machine.

13. A control module for controlling an electrical machine, comprising:
    a magnet management module in communication with an operating point control module,
    wherein the magnet management module:
        receives a temperature of a plurality of ferrite-type permanent magnets in an electrical machine;
        compares the temperature with a predetermined temperature; and
        sends current injection information to the operating point control module of the electrical machine, wherein the current injection information comprises instructions configured to prevent demagnetization of the plurality of ferrite-type permanent magnets.

14. The control module of claim 13, wherein back-emf information from the operating point control module is received by the magnet management module.

15. The control module of claim 14, wherein the back-emf information is derived from a current, a voltage, and a position of the electrical machine.

16. The control module of claim 13, wherein the current injection information comprises instructions for the operating point control module to perform at least one of:
    heat the plurality of ferrite-type permanent magnets for a fixed duration of time;
    heat the plurality of ferrite-type permanent magnets to a predetermined temperature; and
    heat the plurality of ferrite-type permanent magnets to a predetermined rate of rise in temperature.

17. The control module of claim 13, wherein the current injection information comprises instructions for the operating point control module to perform at least one of:
    derate operation of the electrical machine; and
    delay operation of the electrical machine.

18. The control module of claim 17, wherein the instruction for derating operation of the electrical machine comprises instructions to limit current to the electrical machine.

19. The control module of claim 17, wherein the instruction for delaying operation of the electrical machine comprises instructions to perform one of:
    deactivate operation of the electrical machine;
    delay operation of the electrical machine for a time duration;
    delay operation of the electrical machine until a predetermined temperature is reached; and
    delay operation of the electrical machine until a predetermined rate of rise in temperature is reached.

20. The control module of claim 13, wherein the magnet management modules estimates the temperature of the plurality of ferrite-type permanent magnets based on one of:
- indirectly measuring at least one temperature of the plurality of ferrite-type permanent magnets;
- estimating one of motor terminal quantities; and
- injecting one of test current and test voltage to the electrical machine.

21. A controller for an electrical machine, comprising:
a magnet management module in communication with an operating point control module, wherein the magnet management module:
- receives or estimate a back-emf of a ferrite-type permanent magnet machine, said ferrite-type permanent magnet machine having a plurality of ferrite-type permanent magnets;
- compares the received or estimated back-emf with a predetermined back-emf; and
- sends current injection information to the operating point control module, wherein the current injection information comprises instructions configured to prevent demagnetization of the plurality of ferrite-type permanent magnets.

22. The controller of claim 21, wherein the current injection information comprises instructions configured to perform at least one of:
- derate operation of the ferrite-type permanent magnet machine; and
- delay operation of the ferrite-type permanent magnet machine.

23. The controller of claim 22, wherein the derate operation comprises instructions to limit current to the ferrite-type permanent magnet machine.

24. A method of controlling a ferrite-type permanent magnet electrical machine, the method comprising:
- measuring a magnetization level of a plurality of ferrite-type permanent magnets of a motor;
- sending the magnetization level to a magnet management module, wherein the magnet management module:
- determines if the magnetization level is above a predetermined level; and if so, then perform
at least one of the following:
- selectively heat the plurality of ferrite-type permanent magnets in order to prevent demagnetization of the plurality of ferrite-type permanent magnets; and
- derate the electrical machine.

25. The method of claim 24, wherein the magnetization level is estimated based on one of:
- at least one of voltage and current quantities;
- injecting one of test voltage and test current to the electrical machine; and
- short circuit testing.

26. A controller, comprising:
a magnet management module in communication with an operating point control module, wherein the magnet management module:
- injects one of a current or a voltage to a ferrite-type permanent magnet machine, said ferrite-type permanent magnet machine having a plurality of ferrite-type permanent magnets;
- estimates impedance based on the injecting;
- selectively heats the plurality of ferrite-type permanent magnets based on the estimated impedance; and
- limits current to the machine.

* * * * *